March 19, 1963    J. W. ANDERSON    3,081,672
UNIVERSAL REPLACEMENT MIRROR
Filed March 17, 1960

INVENTOR.
JOHN W. ANDERSON
BY
W. E. Recktenwald
ATTORNEY

United States Patent Office 3,081,672
Patented Mar. 19, 1963

3,081,672
UNIVERSAL REPLACEMENT MIRROR
John W. Anderson, 578 Broadway, Gary, Ind.
Filed Mar. 17, 1960, Ser. No. 15,710
3 Claims. (Cl. 88—98)

This invention relates to rear view mirrors, and more particularly an an attachment serving as a replacement glass for such mirrors.

From time to time, rear view mirrors of the type used on motor vehicles have to be replaced because of breakage of the glass or due to the effect of the elements thereon. The supporting structure of the mirror is generally still in good serviceable condition, but without the mirror element the unit is in effect useless. An attempt has been made to supply replacements for the mirror and mirror case, but this has failed due to the many different sizes and shapes of mirror that required an unreasonably large inventory to be maintained to provide any degree of service.

The primary object of this invention, therefore, is to provide a single mirror replacement in the form of an economy attachment which is adapted to fit onto the case of most current types of rear view mirrors.

It is another object of this invention to provide an attachment of the kind mentioned comprising a one-piece casing of elastomeric material for supporting and protecting an attachment mirror and for mounting the same upon the case of a conventional mirror.

It is a further object of this invention to provide an attachment of the kind mentioned including mounting means of elastomeric material adapted to be stretched over and supported upon the case of any conventional rear view mirror.

It is a still further object of this invention to provide an attachment of the kind mentioned which can be manufactured at relatively low cost and is easy to install without resorting to special tools.

These and other objects and advantages of the invention will become apparent as the disclosure proceeds. The invention will be best understood from a consideration of the following detailed description taken in connection with the accompanying drawings. It is to be understood, however, that the invention is not to be confined to any strict conformity with the showing of the drawings and may be modified so long as such changes or modifications mark no material departure from the salient features of the invention as expressed in the appended claims.

This invention, in general, comprises a mirror bearing attachment of elastomeric material. The attachment including an annular wall portion adapted to be stretched over the case of current types of vehicle rear view mirrors for mounting the attachment over an existing mirror.

Figure 1:
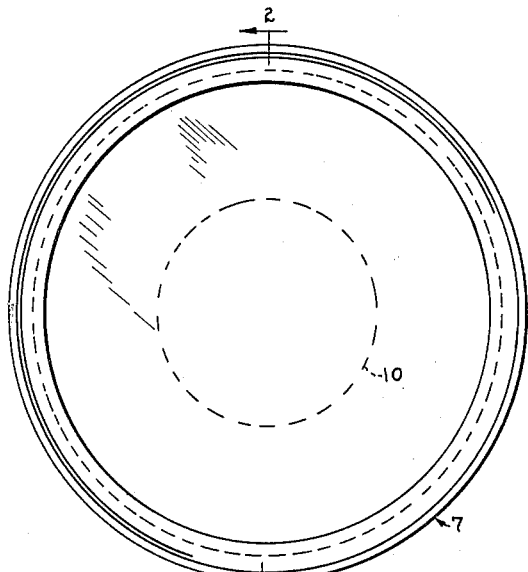
FIGURE 1 is a front view partly in phantom of the attachment of this invention.
Figure 2:
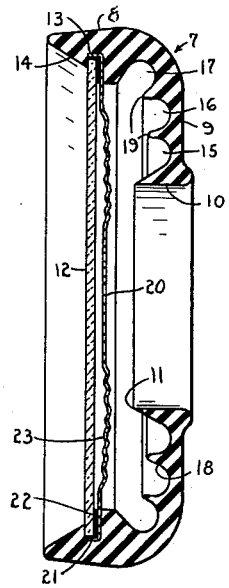
FIGURE 2 is a cross-sectional view taken along the lines 2—2 of FIGURE 1.

In detail, and referring more particularly to the drawings, wherein similar reference numerals refer to similar parts throughout the several views, and specifically to FIGURES 1 and 2, numeral 7 designates a cupped annular body formed of elastomeric material, such as stretchable rubber or the like. Body 7 consists essentially of a ring portion 8 and a wall portion 9 integral with a side edge of the ring portion. Wall portion 9 is formed with a central opening 10, the inner end of the wall defining said opening being tapered to a thin edge 11, for a purpose to appear hereinafter. Ring portion 8 defines a holder for mirror 12. To this end, the inner surface of portion 8 is formed with a circumferential groove 13, receiving the periphery of mirror 12. Starting at groove 13, the inner wall of portion 8 is flared outwardly at 14, both for appearance and to facilitate insertion of the mirror into groove 13.

The size of opening 10 and the elasticity of the material of wall 9 is such that it may be stretched so as to permit insertion of the case of many current type outside vehicle mirrors through opening 10. The inner side of wall 9 is shown provided with three concentric grooves, designated 15, 16 and 17, one or another of which is adapted to accommodate the periphery of the case of at least four current sizes of rear view mirrors. The walls 18 between the several grooves taper to a relatively thin edge 19 for insuring sealing contact with the rear of the mirror case on which the attachment is to be applied.

The rear of mirror 12 is protected against the elements and also against damage by a metal backing plate 20 which forms no part of this invention, but is shown and claimed in my U.S. Patent 2,187,582 dated January 16, 1940. For this purpose, plate 20 has a peripheral flange 21 sealed to the mirror. Plate 20 is held in spaced relation to the back of mirror 12 by means of spacer rings 22. Plate 20 is formed with concentric corrugations 23 and is adapted to protect the silvering on the back of the mirror both from the elements and from scratching or chipping.

Figure 3:
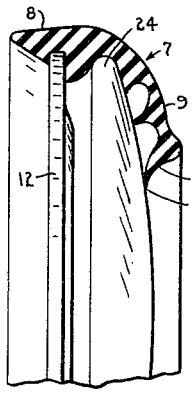
FIGURES 3 to 6 are detail views, each illustrating the invention as applied to the case of several different styles of current rear view mirrors.
Figure 4:
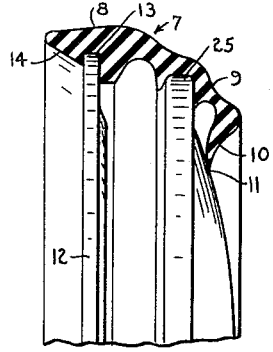
Figure 5:
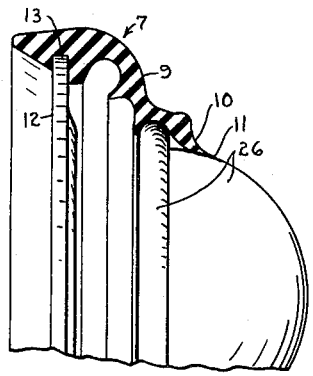
Figure 6:
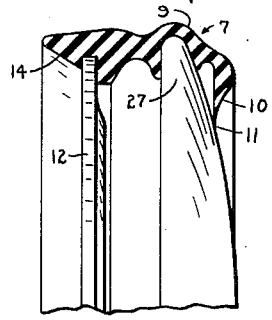

The mirror case 24, shown in FIGURE 3, is one of the more common types, and is approximately the same diameter as the mounted mirror 12. Other cases 24, 25, 26 or 27, as shown in FIGURES 3, 4, 5 and 6, respectively, represent the original case holding a broken or otherwise defective mirror. The case 24 of this type mirror is shown received in groove 17, though it may be received in groove 16 as an option. The size of mirror case 25, shown in FIGURE 4, is of less diameter than glass 12, and is illustrated as best seated in groove 16. The size of mirror 26, illustrated in FIGURE 5, is of considerably less diameter than either of those just mentioned, and groove 15 is provided to receive this type. The mirror 27, of FIGURE 6, is of greater diameter than mirror 12 of my attachment, yet it can be accommodated in intermediate groove 16 as illustrated. The shape of the case over which my plastic angular body may be received, while shown as annular, may be of other shapes as well as including rectangular or oval.

While the present attachment is designed to make snug sealing contact with the periphery of many of the conventional rear view mirrors likely to be encountered, it should be noted that the thin edges 19 of walls 18, as shown in FIGURES 3 to 6, engage the back of the cases to which this attachment might be applied for sealing out moisture. The thin edge 11 of opening 10 functions in the same manner and also contributes to the neatness of the attachment when applied.

While a specific form of the invention has been shown by way of example, it is to be understood that the scope of the invention is to be limited only as recited in the following claims.

I claim:

1. A replacement mirror assembly comprising: a one-piece body of elastomeric material including an annular portion and an integral wall portion, the inner surface of the annular portion being formed with a circumferential groove, a mirror having its periphery seated in the groove with the mirror substantially parallel to and facing away from the wall portion, said wall portion having an opening centrally thereof of a size smaller than the ring portion whereby the wall portion may be stretched over and mounted upon the case of a conventional mirror, and additional concentric grooves on the surface of the wall facing the mirror adapted to grip the edge of the case of a conventional mirror when the attachment is mounted thereon.

2. An attachment for rear-view mirrors comprising a cupped elastic rubber body including an annular ring portion and a wall portion extending radially inward from one edge of said ring portion, a mirror mounted within said ring portion and facing away from said wall portion, said wall portion having a central opening therein, the size of said opening being smaller than the ring portion and the elasticity of said wall portion being such that said opening may be stretched for reception of the case of a conventional mirror, the inner face of said wall portion being formed with a plurality of concentric grooves for selectively receiving cases of different diameter.

3. The structure of claim 2 wherein a portion of the wall adjacent said opening terminates in a thin edge portion adapted to provide sealing contact with said case.

References Cited in the file of this patent
UNITED STATES PATENTS

| | | |
|---|---|---|
| 886,273 | Tanzey | Apr. 28, 1908 |
| 2,215,829 | Evans | Sept. 24, 1940 |
| 2,495,347 | Ritz-Woller | Jan. 24, 1950 |
| 2,729,142 | Beach | Jan. 3, 1956 |
| 2,978,958 | Dover | Apr. 11, 1961 |